United States Patent
Chen et al.

(10) Patent No.: US 10,649,066 B2
(45) Date of Patent: May 12, 2020

(54) POSITIONING SYSTEM AND METHOD THEREOF

(71) Applicant: HTC Corporation, Taoyuan (TW)

(72) Inventors: Yuan-Tung Chen, Taoyuan (TW); Tzu-Chieh Yu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 303 days.

(21) Appl. No.: 15/853,985

(22) Filed: Dec. 26, 2017

(65) Prior Publication Data

US 2018/0180711 A1    Jun. 28, 2018

Related U.S. Application Data

(60) Provisional application No. 62/439,064, filed on Dec. 26, 2016.

(51) Int. Cl.
    *G01S 5/26*      (2006.01)
    *G01S 5/28*      (2006.01)
    *G02B 27/01*      (2006.01)
    *G06T 19/00*      (2011.01)
    (Continued)

(52) U.S. Cl.
CPC ............ *G01S 5/26* (2013.01); *G01S 5/28* (2013.01); *G01S 5/30* (2013.01); *G01S 11/16* (2013.01); *G02B 27/017* (2013.01); *G06T 19/003* (2013.01)

(58) Field of Classification Search
CPC ... G01S 5/26; G01S 5/30; G01S 11/16; G01S 5/28; G01S 11/14; G01S 5/20; G06T 19/003; G02B 27/017
See application file for complete search history.

(56) References Cited

U.S. PATENT DOCUMENTS

| | | |
|---|---|---|
| 5,504,477 A | 4/1996 | Whitright et al. |
| 2004/0113805 A1 | 6/2004 | Fardin et al. |
| 2004/0143176 A1 | 7/2004 | Foxlin |

(Continued)

FOREIGN PATENT DOCUMENTS

TW      200804855 A      1/2008

OTHER PUBLICATIONS

Corresponding extended European search report dated May 17, 2018.
Corresponding Taiwan office action dated Apr. 26, 2019.

*Primary Examiner* — Daniel Pihulic
(74) *Attorney, Agent, or Firm* — CKC & Partners Co., LLC (57) ABSTRACT

A positioning system and method thereof are provided in this disclosure. The positioning method includes steps of: emitting a radiation from a first electronic apparatus to a second electronic apparatus and starting to accumulate a time count; sensing the radiation on the second electronic apparatus and sending a first ultrasonic signal from the second electronic apparatus to the first electronic apparatus; sensing the first ultrasonic signal by a plurality of ultrasound sensors on the first electronic apparatus and calculating a plurality of first time periods started from the radiation is emitted until the first ultrasonic signal is sensed by the ultrasound sensors; calculating a plurality of first relative distances between the ultrasound sensors and a first ultrasound emitter on the second electronic apparatus; and locating a first relative position of the second electronic apparatus relative to the first electronic apparatus according to the first relative distances.

17 Claims, 7 Drawing Sheets

(51) Int. Cl.
*G01S 11/16* (2006.01)
*G01S 5/30* (2006.01)

(56) References Cited

U.S. PATENT DOCUMENTS

2006/0239121 A1* 10/2006 Kong ................... G01S 5/30
                                                    367/128
2008/0084789 A1   4/2008 Altman

* cited by examiner

POSITIONING SYSTEM AND METHOD THEREOF

CROSS-REFERENCE TO RELATED APPLICATION

This application claims priority to U.S. Provisional Application Ser. No. 62/439,064, filed on Dec. 26, 2016, which is herein incorporated by reference.

BACKGROUND

Field of Invention

The present application relates to a positioning system. More particularly, the present application relates to a positioning system for locating the relative positions of controllers.

Description of Related Art

In the current virtual reality (VR) environment, controller devices are commonly used to interact with VR scenes, such as game themes or VR contents. Usually, a virtual reality system has a head-mounted display (HMD), a positional tracking device and controllers. The positional tracking device is configured for tracking the position and orientation of the HMD and controllers. However, the positional tracking device has some limitations (e.g., because the controllers are blocked by the user's body or objects in the environment, the positional tracking device couldn't track the user's controllers).

SUMMARY

An aspect of the disclosure is to provide a positioning system. The positioning system includes a first electronic apparatus and a second electronic apparatus. The first electronic apparatus includes a light emitting unit, a plurality of ultrasound sensors and a processor. The light emitting unit is configured for emitting a radiation. The processor is coupled to the light emitting unit and the ultrasound sensors. The second electronic apparatus includes a first optical sensor and a first ultrasound emitter. The first optical sensor is configured for sensing the radiation sent from the first electronic apparatus. The first ultrasound emitter is configured for sending a first ultrasonic signal when the radiation is sensed by the first optical sensor. The ultrasound sensors are configured to sense the first ultrasonic signal, the processor is configured to calculate a plurality of first time periods started from the radiation is emitted until the first ultrasonic signal is sensed by the ultrasound sensors, to calculate a plurality of first relative distances between the ultrasound sensors and the first ultrasound emitter, and to locate a relative position of the second electronic apparatus relative to the first electronic apparatus according to the first relative distances.

Another aspect of the disclosure is to provide a positioning system. The positioning system includes a first electronic apparatus and a second electronic apparatus. The first electronic apparatus includes an ultrasound emitter, an optical sensor and a processor. The ultrasound emitter is configured for sending an ultrasonic signal. The processor is coupled to the ultrasound emitter and the optical sensor. The second electronic apparatus includes a plurality of ultrasound sensors and a first light emitting unit. The ultrasound sensors are configured for sensing the ultrasonic signal sent from the first electronic apparatus. The first light emitting unit is configured for emitting a plurality of radiations. The optical sensor is configured to sense the radiations, the processor is configured to calculate a plurality of first time periods started from the ultrasonic signal is sent until the radiations are sensed by the optical sensor, to determine a plurality of first relative distances between the ultrasound sensors of the second electronic apparatus and the ultrasound emitter, and to locate a relative position of the second electronic apparatus relative to the first electronic apparatus according to the first relative distances.

Another aspect of the disclosure is to provide a positioning method suitable for a positioning system including a first electronic apparatus and a second electronic apparatus. The positioning method includes operations of: emitting a radiation from a first electronic apparatus to a second electronic apparatus and starting to accumulate a time count; sensing the radiation on the second electronic apparatus and sending a first ultrasonic signal from the second electronic apparatus to the first electronic apparatus; sensing the first ultrasonic signal by a plurality of ultrasound sensors on the first electronic apparatus and calculating a plurality of first time periods started from the radiation is emitted until the first ultrasonic signal is sensed by the ultrasound sensors; calculating a plurality of first relative distances between the ultrasound sensors and a first ultrasound emitter on the second electronic apparatus; and locating a relative position of the second electronic apparatus relative to the first electronic apparatus according to the first relative distances.

Based on aforesaid embodiments, the first electronic apparatus in the positioning system is capable of calculating the time periods started from the radiation is emitted until the ultrasonic signal is sensed by the ultrasound sensors, and acquiring the relative distances between the ultrasound sensors and the ultrasound emitter according to the time periods. In some embodiments, it is not necessary to synchronize clock signals between the first electronic apparatus and the second electronic apparatus. The relative distance can be obtained according to the time count accumulated on the first electronic apparatus. The second electronic apparatus is not required to include a timer circuit with high preciseness.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
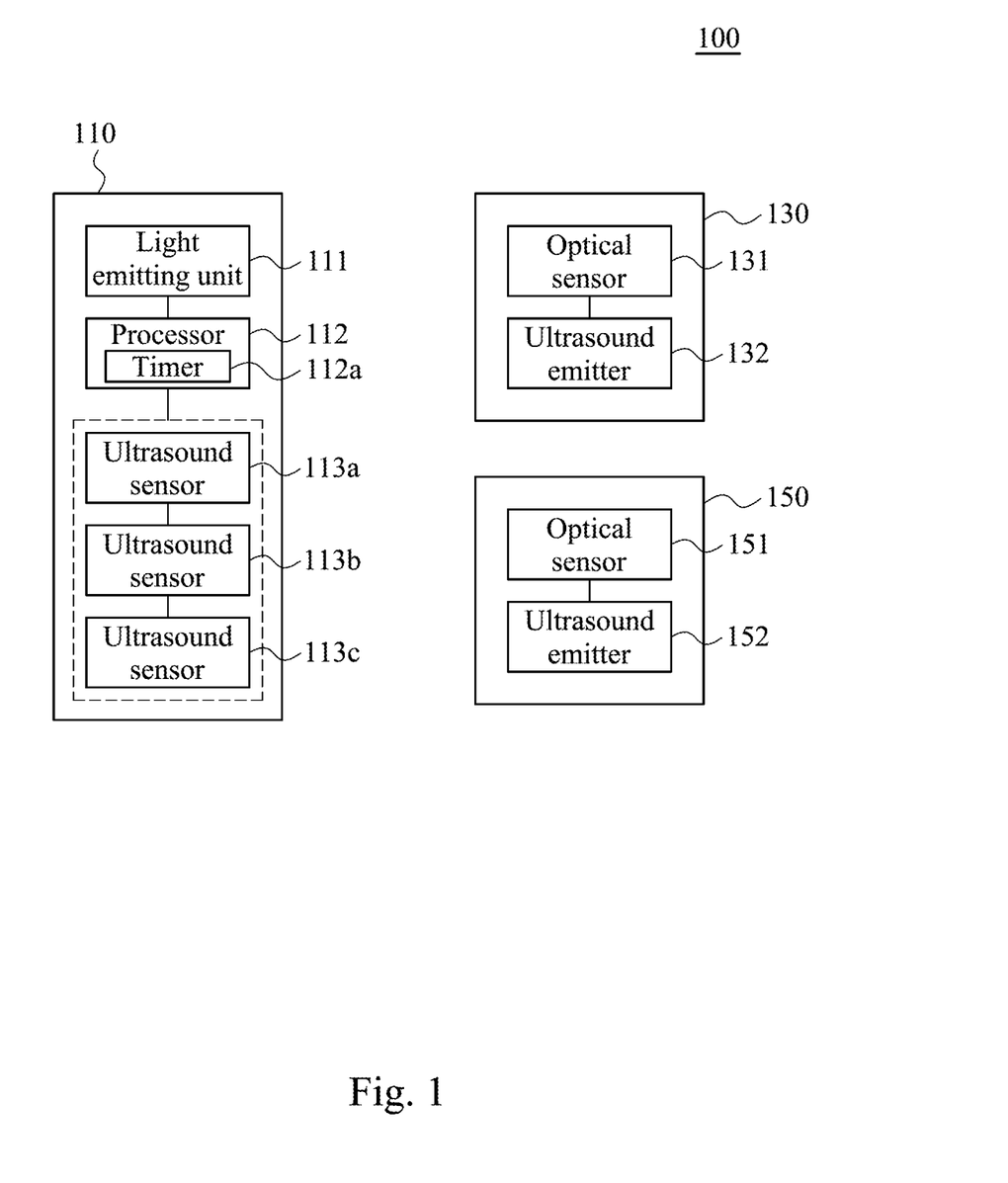
FIG. 1 is a functional block diagram illustrating a positioning system according to an embodiment of the disclosure.

Reference is made to FIG. 1, which is a functional block diagram illustrating a positioning system 100 according to an embodiment of the disclosure. As shown in FIG. 1, the positioning system 100 includes a first electronic apparatus 110, a second electronic apparatus 130 and a third electronic apparatus 150. The first electronic apparatus 110 can be implemented by a head-mounted device (HMD). The second electronic apparatus 130 and the third electronic apparatus 150 can be implemented by controller devices communicated with the head-mounted device.

The first electronic apparatus 110 includes a light emitting unit 111, a processor 112 and a plurality of ultrasound sensors 113*a*, 113*b* and 113*c*. The processor 112 includes a timer 112*a*. The processor 112 is coupled to the light emitting unit 111 and the ultrasound sensors 113*a*, 113*b* and 113*c*. The second electronic apparatus 130 includes an optical sensor 131 and an ultrasound emitter 132. The optical sensor 131 is coupled to the ultrasound emitter 132. The third electronic apparatus 150 includes an optical sensor 151 and an ultrasound emitter 152. The optical sensor 151 is coupled to the ultrasound emitter 152. The processor 112 can be implemented by a graphics processor, a central processing unit, a control circuit and/or a graphics processing unit.

Figure 2:
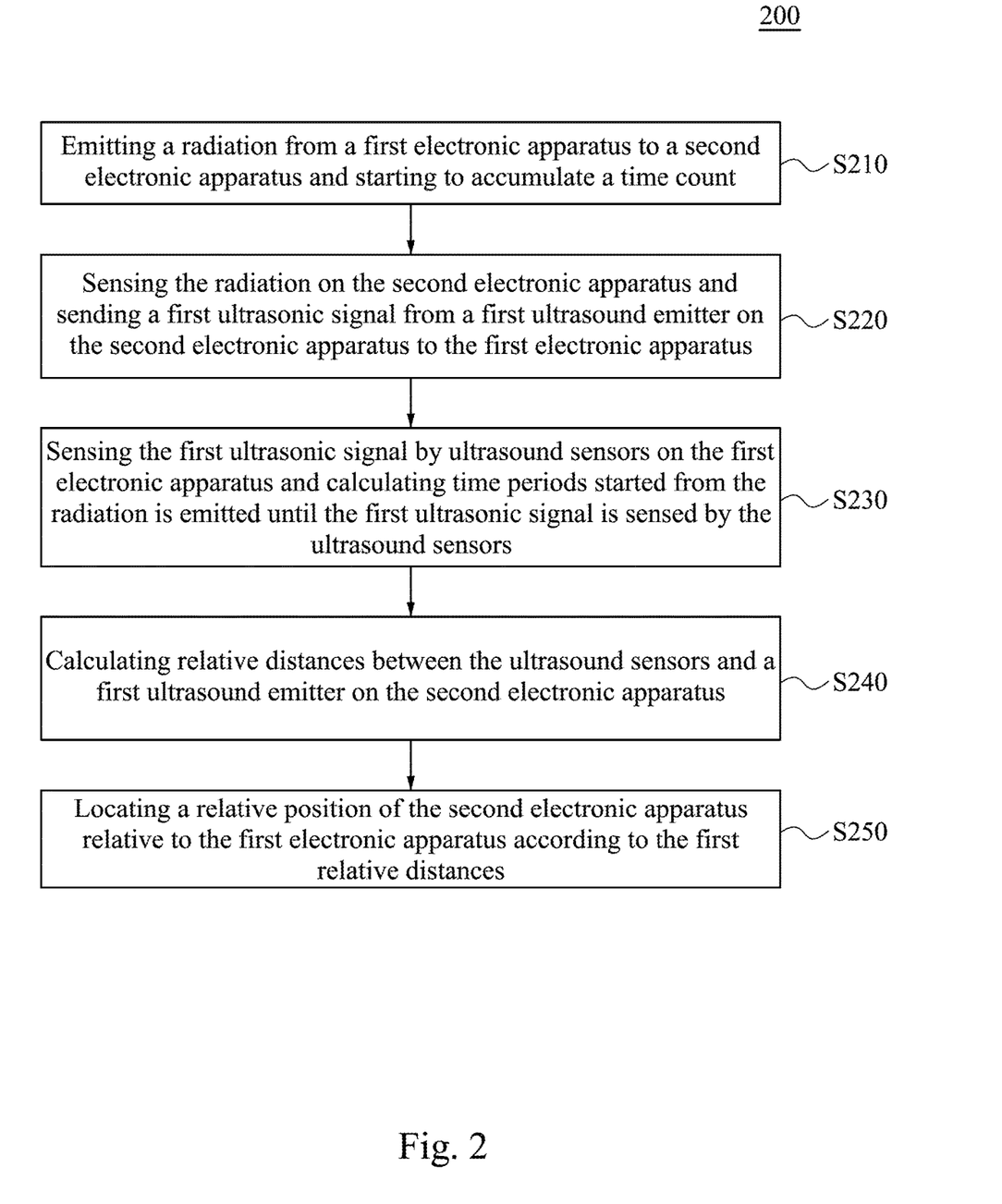
FIG. 2 is a flow diagram illustrating a positioning method according to an embodiment of this disclosure.

Reference is made to FIG. 2, which is a flow diagram illustrating a positioning method 200 according to an embodiment of this disclosure. In the embodiment, the positioning method 200 can be utilized to calculate a relative position of the second electronic apparatus 130 relative to the first electronic apparatus 110 and another relative position of the third electronic apparatus 150 relative to the first electronic apparatus 110.

Reference is made to FIG. 1 and FIG. 2. As the embodiment shown in FIG. 2, the positioning method 200 firstly executes step S210 to emit a radiation from a first electronic apparatus 110 to a second electronic apparatus 130 and starting to accumulate a time count. In the embodiment, a light emitting unit 111 of the first electronic apparatus 110 is configured for emitting a radiation and a processor 112 is configured for starting to accumulate a time count.

Afterward, the positioning method 200 executes step S220 to sense the radiation on the second electronic apparatus 130 and send a first ultrasonic signal from the ultrasound emitter 132 on the second electronic apparatus 130 to the first electronic apparatus 110. In the embodiment, an optical sensor 131 of the second electronic apparatus 130 is configured for sensing the radiation sent from the first electronic apparatus 110 and an ultrasound emitter 132 of the second electronic apparatus 130 is configured for sending a first ultrasonic signal to the first electronic apparatus 110.

Afterward, the positioning method 200 executes step S230 to sense the first ultrasonic signal by ultrasound sensors 113*a*, 113*b* and 113*c* on the first electronic apparatus 110 and calculate time periods started from the radiation is emitted until the first ultrasonic signal is sensed by the ultrasound sensors 113*a*, 113*b* and 113*c*. In the embodiment, the ultrasound sensors 113*a*, 113*b* and 113*c* disposed at different positions on the first electronic apparatus 110. Therefore, the first ultrasonic signal is sensed by the ultrasound sensor 113*a*, the ultrasound sensor 113*b* and the ultrasound sensor 113*c* with time differences.

Figure 3:
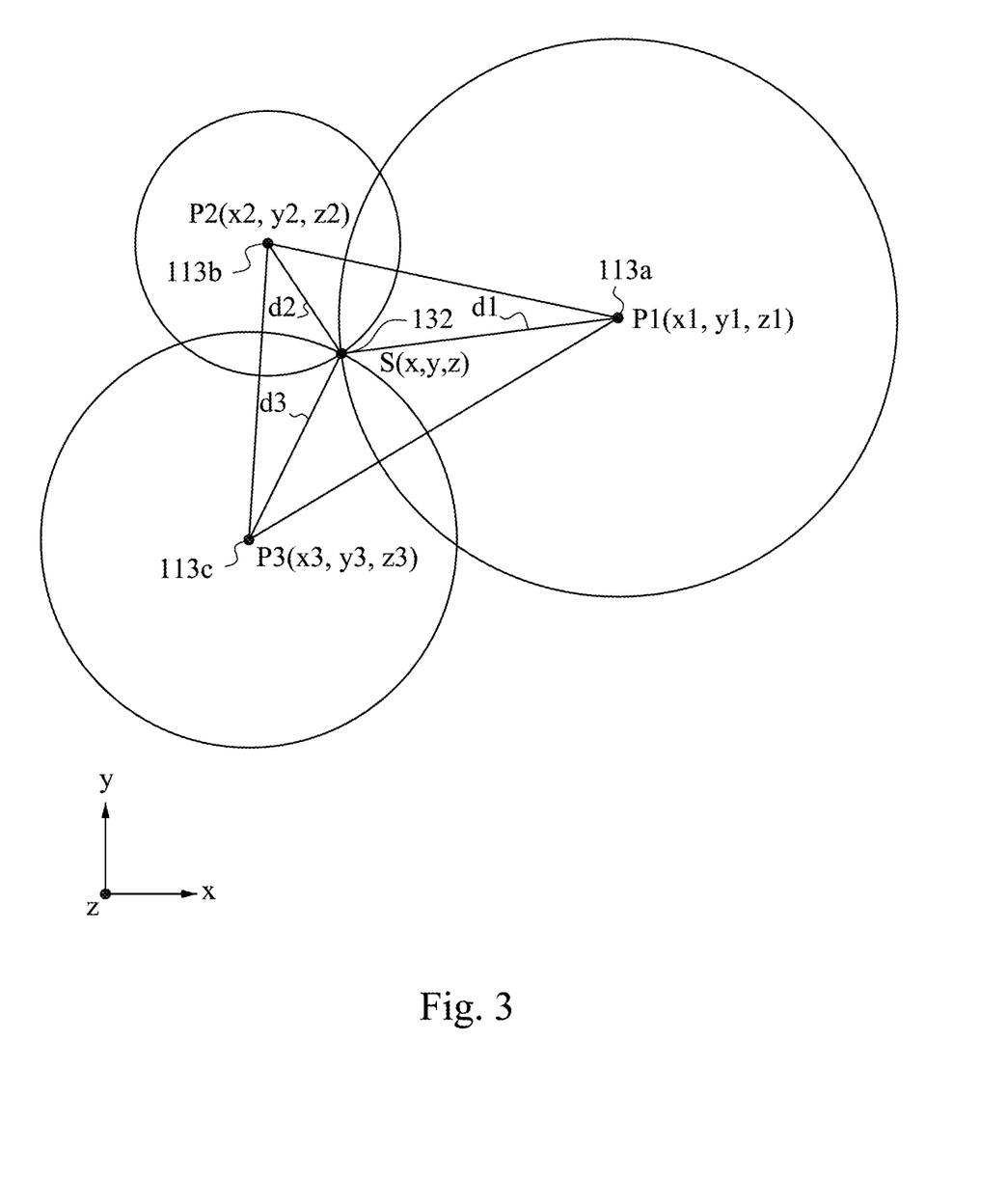
FIG. 3 is a schematic diagram illustrating a relative position of the second electronic apparatus according to an embodiment of the disclosure.

Afterward, the positioning method 200 executes step S240 to calculate relative distances between the ultrasound sensors 113*a*, 113*b* and 113*c* and the ultrasound emitter 132 on the second electronic apparatus 130. Reference is made to FIG. 3. FIG. 3 is a schematic diagram illustrating a relative position of the second electronic apparatus 130 according to an embodiment of the disclosure. As the example shown in FIG. 3, a point P1 is represented by the ultrasound sensor 113*a*, a point P2 is represented by the ultrasound sensor 113*b*, a point P3 is represented by the ultrasound sensor 113*c* and a point S is represented by the ultrasound emitter 132. The coordinate of the point P1 is (x1, y1, z1), the coordinate of the point P2 is (x2, y2, z2), the coordinate of the point P3 is (x3, y3, z3) and the coordinate of the point S is (x, y, z). It is noticed that, the time periods is corresponded to the point P1, P2 and P3. Once the time period between the point P1 and the point S in step S230 is determined, the distance d1 between the point P1 and the point S is utilized the time period and the sound velocity to obtain. In this embodiment, the sound velocity can be assumed to be 340 m/s. Therefore, the distance d2 and the distance d3 also could be calculated by the time periods and sound velocity.

Afterward, the positioning method 200 executes step S250 to locate a relative position of the second electronic apparatus 130 relative to the first electronic apparatus 110 according to the first relative distances. As the example shown in FIG. 3, because the ultrasound sensor 113*a*, 113*b* and 113*c* is disposed on the first electronic apparatus 110, the coordinate of the point P1, P2 and P3 is obtained. The coordinate (x, y, z) of the point S could be calculated by Formula 1. Therefore, the coordinate of the ultrasound emitter 132 of the second electronic apparatus 130 is obtained.

$$di^2 = (x-xi)^2 + (y-yi)^2 + (z-zi)^2 \quad i=1,2,3 \qquad \text{(Formula 1)}$$

Figure 4:
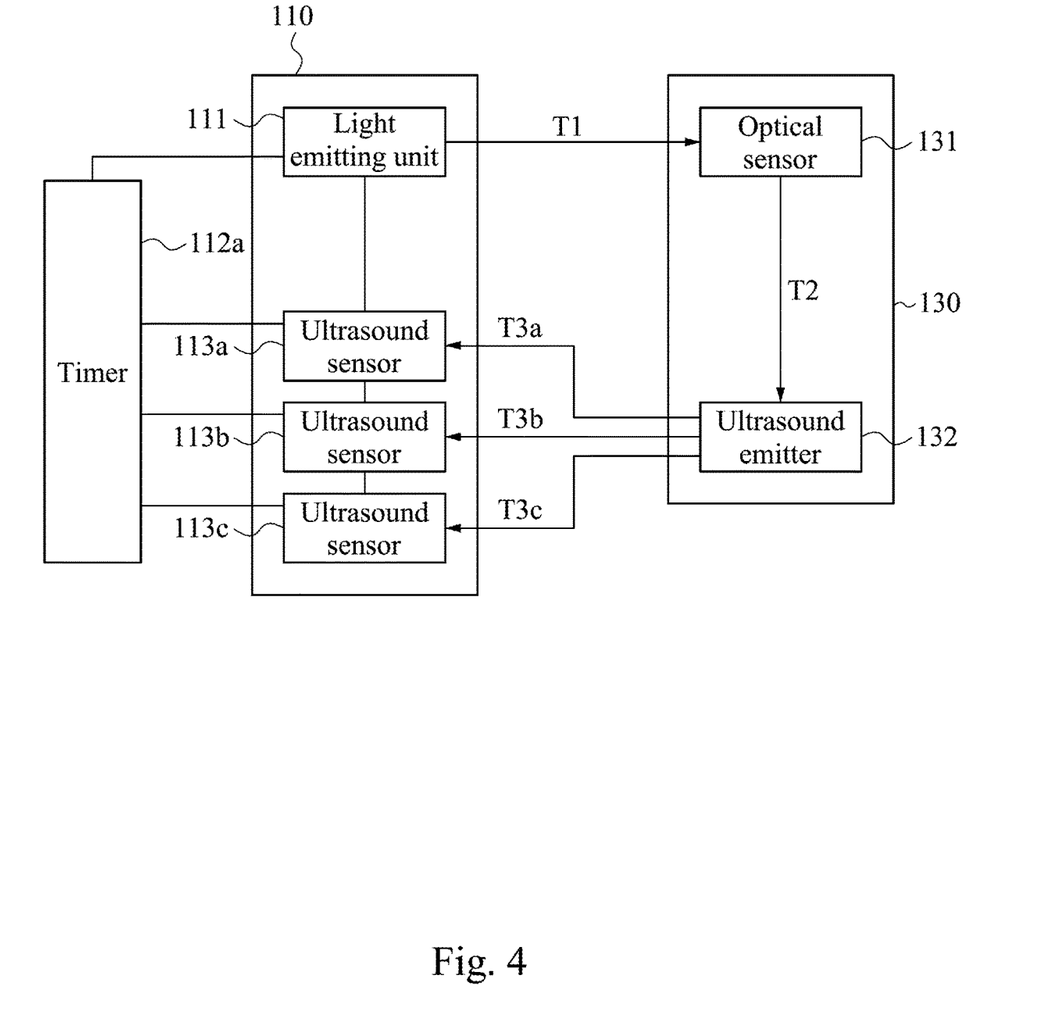
FIG. 4 is a schematic diagram illustrating a calculation of the time periods according to an embodiment of the disclosure.

Reference is made to FIG. 4. FIG. 4 is a schematic diagram illustrating a calculation of the time periods according to an embodiment of the disclosure. As the example shown in FIG. 4, the light emitting unit 111 emits a radiation and the radiation is sensed by the optical sensor 131. The speed of radiation is approximately $3.00 \times 10^8$ m/s, therefore the transmission time T1 of the radiation approaches zero. When the optical sensor 131 senses the radiation, the optical sensor 131 triggers the ultrasound emitter 132 to send the first ultrasonic signal. It is assumed that a response time T2 (induced by a communication between the optical sensor 131 and the ultrasound emitter 132) since the radiation is sensed until the first ultrasonic signal is sent. The transmission time T3*a*, T3*b* and T3*c* of the first ultrasonic signal started from the ultrasound emitter 132 sent the first ultrasonic signal until the first ultrasonic signal is sensed by the ultrasound sensors 113*a*, 113*b* and 113*c*. The timer 112*a* will generate three accumulated time periods including a time period (T1+T2+T3a), another time period (T1+T2+T3b) and still another time period (T1+T2+T3c). Because the transmission time T1 approaches zero and the response time T2 is about a fixed time (about 20 μs), variations of the accumulated time periods will be dominated by the transmission times T3a, T3b and T3c, which are relatively longer than the transmission time T1 of the radiation.

Based on aforesaid embodiments, the first electronic apparatus 110 in the positioning system 100 is capable of calculating three time periods started from the radiation is emitted until the ultrasonic signal is sensed by the three ultrasound sensors 113a, 113b and 113c, and acquiring the relative distances between the ultrasound sensors 113a, 113b and 113c and the ultrasound emitter 132 according to the time periods. In some embodiments, it is not necessary to synchronize clock signals between the first electronic apparatus 110 and the second electronic apparatus 130. The relative distance can be obtained according to the time periods accumulated on the first electronic apparatus 110. The second electronic apparatus 130 is not required to include a timer circuit with high preciseness. Therefore, time synchronization between the first electronic apparatus 110 and the second electronic apparatus 130 is not necessary during the positioning procedure.

Figure 5:
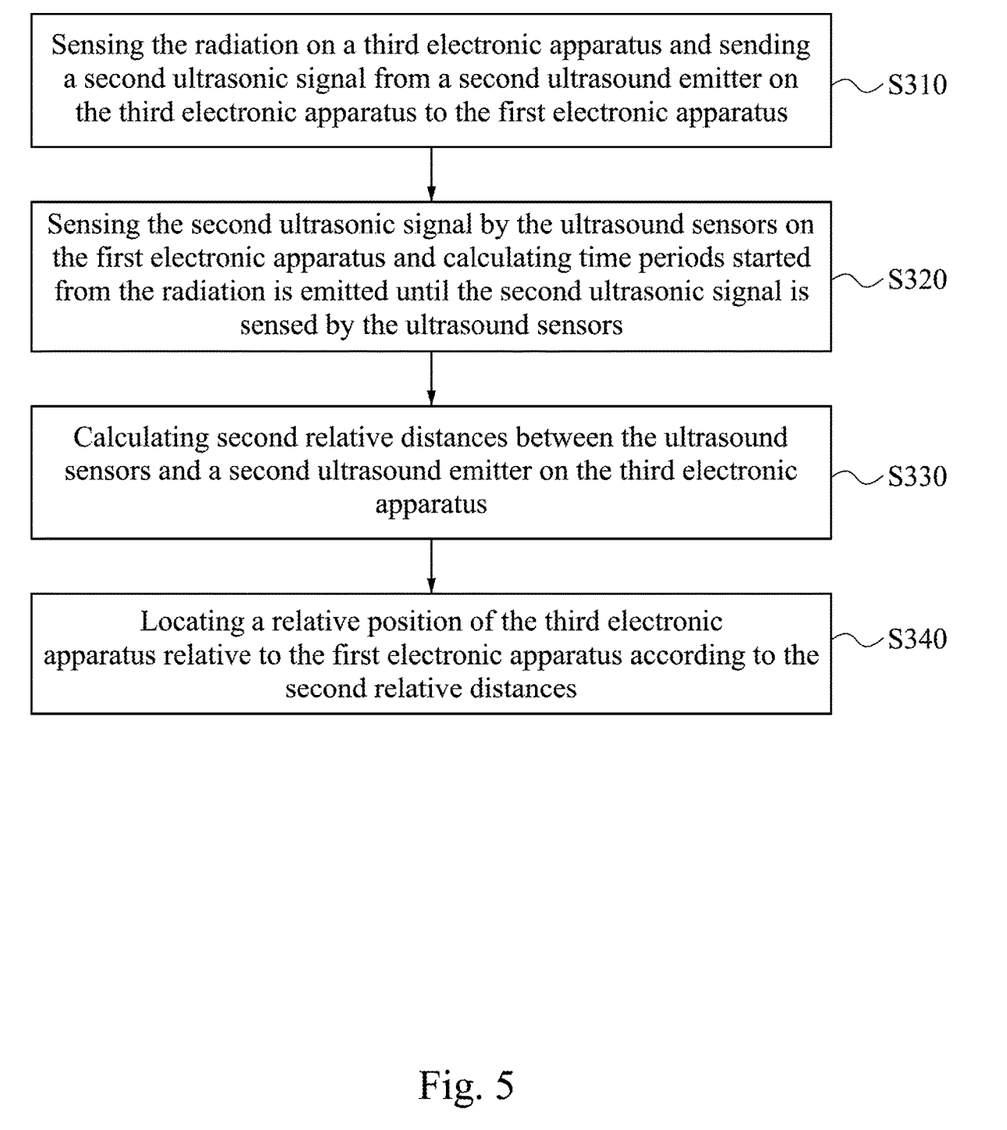
FIG. 5 is a flow diagram illustrating an operating flow between first electronic apparatus and third electronic apparatus according to an embodiment of this disclosure.

Reference is made to FIG. 1 to FIG. 5. FIG. 5 is a flow diagram illustrating an operating flow between first electronic apparatus 110 and third electronic apparatus 150 according to an embodiment of this disclosure. After the Step S210, the positioning method 200 executes step S310 to sense the radiation on a third electronic apparatus 150 and send a second ultrasonic signal from the ultrasound emitter 152 on the third electronic apparatus 150 to the first electronic apparatus 110. In this embodiment, when the light emitting unit 111 of the first electronic apparatus 110 is emitted a radiation, the radiation is sensed by the second electronic apparatus 130 and the third electronic apparatus 150 separately, to execute steps S220~S250 and steps S310~S340.

Afterward, the operating flow of step S320~S340 can be understood from aforesaid embodiment demonstrating the example of step S230~S250, and not further discussed here. It is noticed that, the first electronic apparatus 110 further includes a PWM circuit is coupled with the processor 112 and the light emitting unit 111. The PWM circuit is configured for adjusting a duty ratio of the radiation generated by the light emitting unit 111. When the PWM circuit is set by a first duty ratio, the radiation with the first duty ratio is utilized to trigger the ultrasound emitter 132 of the second electronic apparatus 130; and when the PWM circuit is set by a second duty ratio, the radiation with the second duty ratio is utilized to trigger the ultrasound emitter 152 of the third electronic apparatus 150. Therefore, the first electronic apparatus 110 could control the second electronic apparatus 130 or the third electronic apparatus 150 to send the ultrasonic signal. The PWM circuit is configured to modulate the radiation in different duty ratios for triggering the second electronic apparatus 130 and the third electronic apparatus 150 individually. A manner to trigger different controllers is not limited to utilize the PWM circuit in aforesaid embodiment. In another embodiment, the light emitting unit 111 could emit the different radiations in colors, frequencies, duty ratios or brightness to trigger the different controllers.

Figure 6:
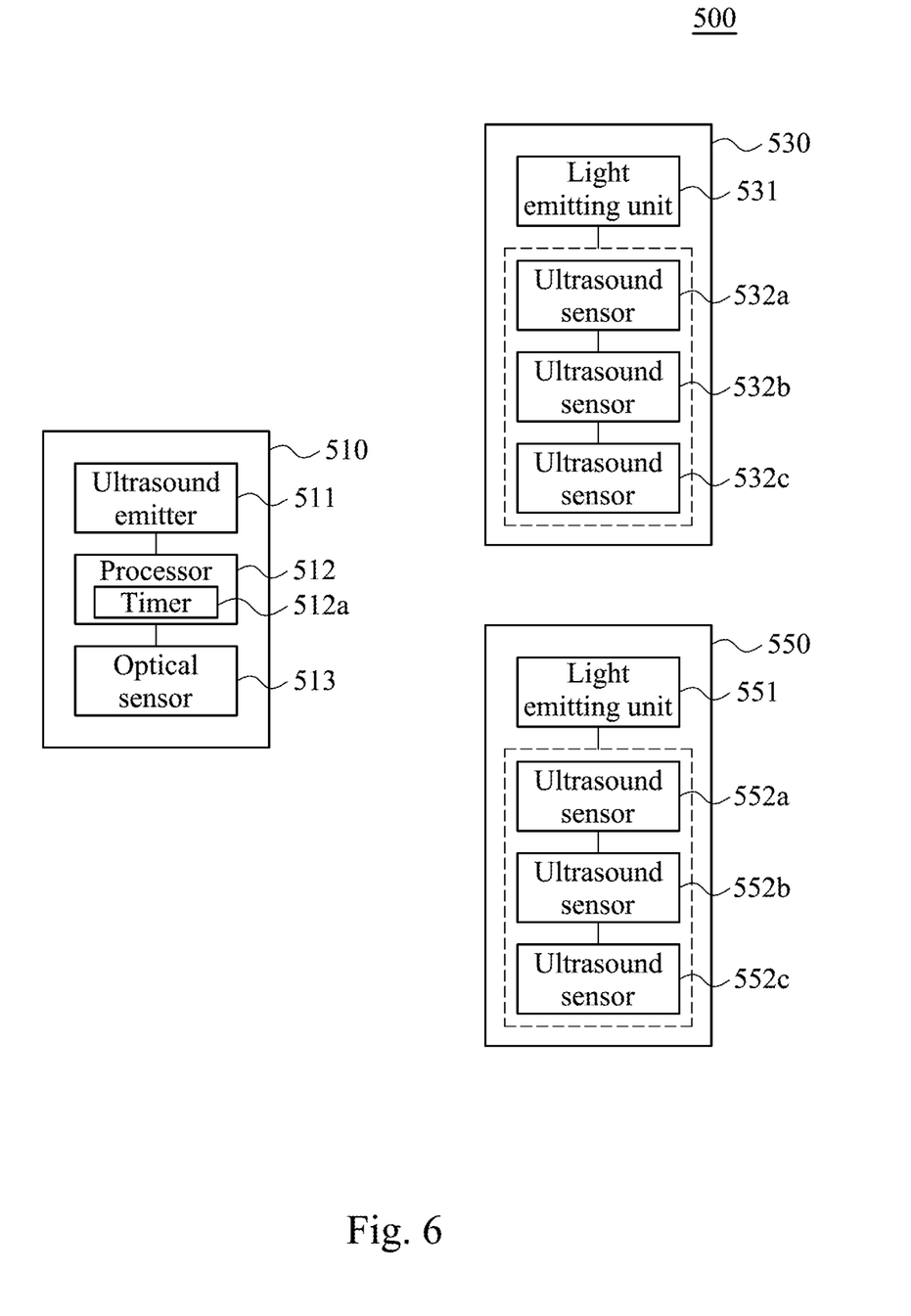
FIG. 6 is a functional block diagram illustrating a positioning system according to an embodiment of the disclosure.

In another embodiment, reference is made to FIG. 6. FIG. 6 is a functional block diagram illustrating a positioning system 500 according to an embodiment of the disclosure. The positioning system 500 includes a first electronic apparatus 510, a second electronic apparatus 530 and a third electronic apparatus 550. The first electronic apparatus 510 can be implemented by a head-mounted device (HMD). The second electronic apparatus 530 and the third electronic apparatus 550 can be implemented by controller devices communicated with the head-mounted device.

The first electronic apparatus 510 includes an ultrasound emitter 511, a processor 512 and an optical sensor 513. The processor 512 includes a timer 512a. The processor 512 is coupled to the ultrasound emitter 511 and the optical sensor 513. The second electronic apparatus 530 includes a light emitting unit 531 and a plurality of ultrasound sensors 532a, 532b and 532c. The light emitting unit 531 is coupled to the ultrasound sensors 532a, 532b and 532c. The third electronic apparatus 550 includes a light emitting unit 551 and a plurality of ultrasound sensors 552a, 552b and 552c. The light emitting unit 551 is coupled to the ultrasound sensors 552a, 552b and 552c. The processor 512 can be implemented by a processor, a central processing unit, a control circuit and/or a graphic processing unit.

Afterward, the ultrasound emitter 511 is configured for sending an ultrasonic signal to the second electronic apparatus 530 and the processor 512 stared to accumulate a time count. The ultrasound sensors 532a, 532b and 532c are configured for sensing the ultrasonic signal sent from the first electronic apparatus 510. When the ultrasound sensors 532a, 532b and 532c are sensed the ultrasonic signal, the light emitting unit 531 is configured for emitting a plurality of radiations. The optical sensor 513 is configured to sense the radiations.

Afterward, the ultrasound sensors 532a, 532b and 532c disposed at different positions on the second electronic apparatus 530. The ultrasonic signal is sensed by the ultrasound sensors 532a, 532b and 532c with time differences. Therefore, the light emitting unit 531 is triggered to send one of the radiations when the ultrasound sensor 532a senses the ultrasonic signal, the light emitting unit 531 is triggered to send another one of the radiations when the ultrasound sensor 532b senses the ultrasonic signal, and the light emitting unit 531 is triggered to send another one of the radiations when the ultrasound sensor 532c senses the ultrasonic signal. In this embodiment, the light emitting unit 531 is triggered three times respectively by the ultrasound sensor 532a, 532b and 532c. The timer 512a calculates three time periods started from the ultrasonic signal is sent from the first electronic apparatus 510 until the radiations are sensed on the first electronic apparatus 510.

Figure 7:
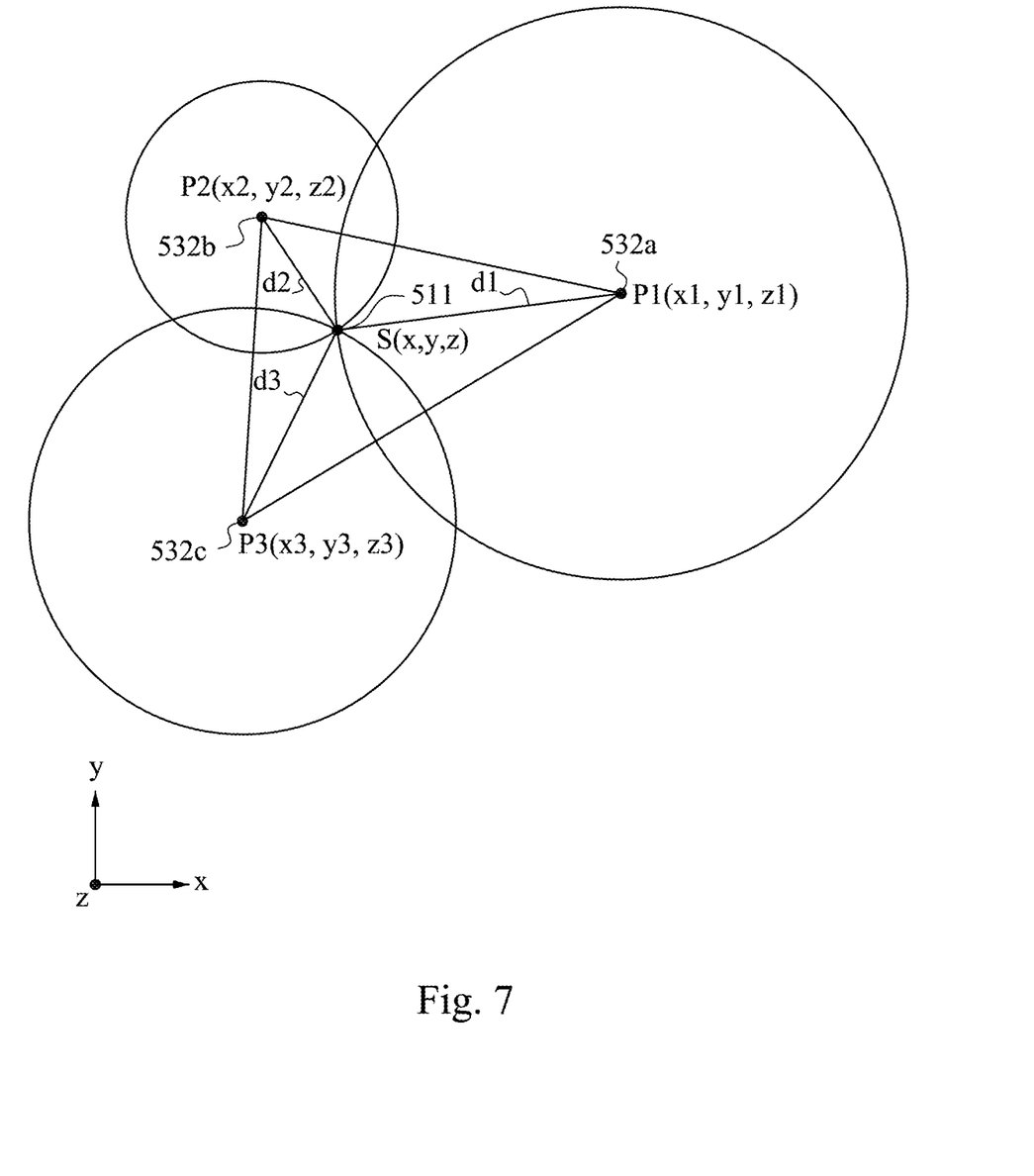
FIG. 7 is a schematic diagram illustrating a relative position of the second electronic apparatus 130 according to an embodiment of the disclosure.

Reference is made to FIG. 7. FIG. 7 is a schematic diagram illustrating a relative position of the second electronic apparatus 530 according to an embodiment of the disclosure. As the example shown in FIG. 7, point P1 is represented by the ultrasound sensor 532a, a point P2 is represented by the ultrasound sensor 532b, a point P3 is represented by the ultrasound sensor 532c and a point S is represented by the ultrasound emitter 511. The coordinate of the point P1 is (x1, y1, z1), the coordinate of the point P2 is (x2, y2, z2), the coordinate of the point P3 is (x3, y3, z3) and the coordinate of the point S is (x, y, z). It is noticed that, the time periods correspond to the point P1, P2 and P3. For example, when the ultrasound sensor 532a senses the ultrasonic signal from the ultrasound emitter 511, the light emitting unit 531 is triggered to send one of the radiations to the optical sensor 513. The time period is corresponding to the point P1. The distance between the ultrasound emitter 511 and the ultrasound sensor 532a could be calculated by the time period and sound velocity (340 m/s).

Afterward, as the example shown in FIG. 7, the coordinate of the point S is obtained (the coordinate of the head-mounted device). The relative coordinate of the point P1, P2 and P3 of each other is obtained, because the ultrasound sensor 532a, 532b and 532c is disposed on the second electronic apparatus 530. Therefore the relative position of the second electronic apparatus 530 (x1, y1, z1) relative to the first electronic apparatus 510 could be calculated by Formula 2. The Formula 2 can be converted into another Formula 3 because the relative position of the point P1, P2 and P3 are already known (i.e., x2=x1+α, y2=y1+α, z2=z1+α, x3=x1+β, y3=y1+β and z3=z1+β, wherein α and β are constants). The relative distance of ultrasound sensor 532b and 532c relative to ultrasound sensor 532a can be calculated through Formula 3.

$$\begin{cases} d1^2 = (x-x1)^2 + (y-y1)^2 + (z-z1)^2 \\ d2^2 = (x-x2)^2 + (y-y2)^2 + (z-z2)^2 \\ d3^2 = (x-x3)^2 + (y-y3)^2 + (z-z3)^2 \end{cases}$$ (Formula 2)

$$\begin{cases} d1^2 = (x-x1)^2 + (y-y1)^2 + (z-z1)^2 \\ d2^2 = (x-x1-\alpha)^2 + (y-y1-\alpha)^2 + (z-z1-\alpha)^2 \\ d3^2 = (x-x1-\beta)^2 + (y-y1-\beta)^2 + (z-z1-\beta)^2 \end{cases}$$ (Formula 3)

In this embodiment, the structure and operating flow of the third electronic apparatus 550 is same as the second electronic apparatus 530 and not to be further discussed here. It is noticed that, the radiations emitted by the light emitting unit 551 are different from the radiations emitted by the light emitting unit 531 in colors, frequencies, duty ratios or brightness. Therefore, the first electronic apparatus 510 is able distinguish the radiations from the light emitting unit 531 and the light emitting unit 551 according to colors, frequencies, duty ratios or brightness of the radiations.

The PWM circuit is configured to modulate the radiation in different duty ratios for triggering the optical sensor 513 of the first electronic apparatus 510. A manner to trigger optical sensor 513 is not limited to utilize the PWM circuit in aforesaid embodiment. In another embodiment, the light emitting unit 531 and the light emitting unit 551 could emit the different radiations in colors, frequencies, duty ratios or brightness to trigger the different controllers.

Based on aforesaid embodiments, the first electronic apparatus 110 in the positioning system 500 is capable of calculating three time periods started from the ultrasonic signal is sent until the radiations is sensed by the optical sensor 513, and acquiring the relative distances between the ultrasound sensors 532a, 532b and 532c and the ultrasound emitter 511 according to the time periods. In some embodiments, it is not necessary to synchronize clock signals between the first electronic apparatus 510, the second electronic apparatus 530 and the third electronic apparatus 550. The relative distance can be obtained according to the time periods accumulated on the first electronic apparatus 510. The second electronic apparatus 530 and the third electronic apparatus 550 are not required to include a timer circuit with high preciseness. Therefore, time synchronization between the first electronic apparatus 510, the second electronic apparatus 530 and the third electronic apparatus 550 is not necessary during the positioning procedure.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A power converter, comprising:
a primary-side switching circuit comprising a plurality of s1. A positioning system, comprising:
a first electronic apparatus, comprising:
  a light emitting unit, configured for emitting a radiation;
  a plurality of ultrasound sensors;
  a processor coupled to the light emitting unit and the ultrasound sensors; and
  a pulse-width modulation (PWM) circuit, electrically coupled with the processor and the light emitting unit, configured for adjusting a duty ratio of the radiation generated by the light emitting unit to make the radiation have a specific duty ratio;
a second electronic apparatus, comprising:
  a first optical sensor, configured for sensing the radiation sent from the first electronic apparatus to determine whether or not the specific duty ratio of the radiation matches a first predetermined duty ratio, wherein when the specific duty ratio of the radiation matches the first predetermined duty ratio, a trigger signal is generated; and
  a first ultrasound emitter triggered by the trigger signal to send a first ultrasonic signal;
wherein, the ultrasound sensors are configured to sense the first ultrasonic signal, the processor is configured to calculate a plurality of first time periods started from the radiation is emitted until the first ultrasonic signal is sensed by the ultrasound sensors, to calculate a plurality of first relative distances between the ultrasound sensors and the first ultrasound emitter, and to locate a first relative position of the second electronic apparatus relative to the first electronic apparatus according to the first relative distances.

2. The positioning system of claim 1, further comprising:
a third electronic apparatus, comprising:
  a second optical sensor to determine whether or not the specific duty ratio of the radiation matches a second predetermined duty ratio, wherein when the specific duty ratio of the radiation matches the second predetermined duty ratio, a trigger signal is generated; and
  a second ultrasound emitter triggered by the trigger signal to send a second ultrasonic signal,
wherein, the ultrasound sensors are configured to sense the second ultrasonic signal, the processor is configured to calculate a plurality of second time periods started from the radiation is emitted until the second ultrasonic signal is sensed by the ultrasound sensors, to calculate a plurality of second relative distances between the ultrasound sensors and the second ultrasound emitter, and to locate a second relative position of the third electronic apparatus relative to the first electronic apparatus according to the second relative distances.

3. The positioning system of claim 2, wherein the first electronic apparatus is a head-mounted device, the second electronic apparatus and the third electronic apparatus are controller devices communicating with the head-mounted device.

4. The positioning system of claim 2, wherein the ultrasound sensors comprises a first ultrasound sensor, a second ultrasound sensor and a third ultrasound sensor disposed at different positions on the first electronic apparatus.

5. The positioning system of claim 4, wherein the first ultrasonic signal is sensed by the first ultrasound sensor, the second ultrasound sensor and the third ultrasound sensor with time differences; the second ultrasonic signal is sensed by the first ultrasound sensor, the second ultrasound sensor and the third ultrasound sensor with time differences.

6. A positioning system, comprising:
a first electronic apparatus, comprising:
an ultrasound emitter, configured for sending an ultrasonic signal;
an optical sensor; and
a processor coupled to the ultrasound emitter and the optical sensor;
a second electronic apparatus, comprising:
a plurality of ultrasound sensors, configured for sensing the ultrasonic signal sent from the first electronic apparatus; and
a first light emitting unit, configured for emitting a plurality of radiations when the ultrasonic signal is sensed by the ultrasound sensors;
wherein, the optical sensor is configured to sense the radiations, the processor is configured to calculate a plurality of first time periods started from the ultrasonic signal is sent until the radiations are sensed by the optical sensor, to determine a plurality of first relative distances between the ultrasound sensors of the second electronic apparatus and the ultrasound emitter, and to locate a first relative position of the second electronic apparatus relative to the first electronic apparatus according to the first relative distances.

7. The positioning system of claim 6, wherein the ultrasound sensors of the second electronic apparatus comprises a first ultrasound sensor, a second ultrasound sensor and a third sensor disposed at different positions on the second electronic apparatus, and the ultrasonic signal is sensed by the first ultrasound sensor, the second ultrasound sensor and the third ultrasound sensor with time differences.

8. The positioning system of claim 7, wherein the first light emitting unit is triggered to send one of the radiations when the first ultrasound sensor senses the ultrasonic signal, the first light emitting unit is triggered to send another one of the radiations when the second ultrasound sensor senses the ultrasonic signal, and the first light emitting unit is triggered to send still another one of the radiations when the third ultrasound sensor senses the ultrasonic signal.

9. The positioning system of claim 6, further comprising:
a third electronic apparatus, comprising:
a plurality of ultrasound sensors, configured for sensing the ultrasonic signal sent from the first electronic apparatus; and
a second light emitting unit, configured for emitting a plurality of radiations;
wherein, the optical sensor is configured to sense the radiations, and the processor is configured to calculate a plurality of second time periods started from the ultrasonic signal is sent until the radiations are sensed by the optical sensor, to determine a plurality of second relative distances between the ultrasound sensors of the third electronic apparatus and the ultrasound emitter, and to locate a second relative position of the third electronic apparatus relative to the first electronic apparatus according to the second relative distances.

10. The positioning system of claim 9, wherein the radiations emitted by the second light emitting unit are different from the radiations emitted by the first light emitting unit in colors, frequencies, duty ratios or brightness.

11. The positioning system of claim 9, wherein the ultrasound sensors of the third electronic apparatus comprises a first ultrasound sensor, a second ultrasound sensor and a third sensor disposed at different positions on the third electronic apparatus, and the ultrasonic signal is sensed by the first ultrasound sensor, the second ultrasound sensor and the third ultrasound sensor with time differences.

12. The positioning system of claim 11, wherein the second light emitting unit is triggered to send one of the radiations when the first ultrasound sensor senses the ultrasonic signal, the second light emitting unit is triggered to send another one of the radiations when the second ultrasound sensor senses the ultrasonic signal, and the second light emitting unit is triggered to send still another one of the radiations when the third ultrasound sensor senses the ultrasonic signal.

13. The positioning system of claim 9, wherein the first electronic apparatus is a head-mounted device, the second electronic apparatus and the third electronic apparatus are controller devices communicating with the head-mounted device.

14. A positioning method, comprising:
generating a radiation having a specific duty ratio:
emitting the radiation from a first electronic apparatus to a second electronic apparatus and starting to accumulate a time count;
sensing the radiation on the second electronic apparatus to determine whether or not the specific duty cycle of the radiation matches a first predetermined duty cycle;
triggering a first ultrasound emitter on the second electronic apparatus to send a first ultrasonic signal to the first electronic apparatus when the specific duty cycle of the radiation matches the first predetermined duty cycle;
sensing the first ultrasonic signal by a plurality of ultrasound sensors on the first electronic apparatus and calculating a plurality of first time periods started from the radiation is emitted until the first ultrasonic signal is sensed by the ultrasound sensors;
calculating a plurality of first relative distances between the ultrasound sensors and the first ultrasound emitter on the second electronic apparatus; and
locating a first relative position of the second electronic apparatus relative to the first electronic apparatus according to the first relative distances.

15. The positioning method of claim 14, further comprising:
sensing the radiation on a third electronic apparatus to determine whether or not the first duty cycle of the radiation matches a second predetermined duty cycle;
triggering a second ultrasound emitter on the third electronic apparatus to the first electronic apparatus when the first duty cycle of the radiation matches the second predetermined duty cycle;
sensing the second ultrasonic signal by the ultrasound sensors on the first electronic apparatus and calculating a plurality of second time periods started from the radiation is emitted until the second ultrasonic signal is sensed by the ultrasound sensors;

calculating a plurality of second relative distances between the ultrasound sensors and the second ultrasound emitter on the third electronic apparatus; and locating a second relative position of the third electronic apparatus relative to the first electronic apparatus according to the second relative distances.

16. The positioning method of claim 15, wherein the ultrasound sensors comprises a first ultrasound sensor, a second ultrasound sensor and a third sensor disposed at different positions on the first electronic apparatus.

17. The positioning method of claim 16, the first ultrasonic signal is sensed by the first ultrasound sensor, the second ultrasound sensor and the third ultrasound sensor with time differences; the second ultrasonic signal is sensed by the first ultrasound sensor, the second ultrasound sensor and the third ultrasound sensor with time differences.

* * * * *